July 11, 1944.  R. E. J. NORDQUIST  2,353,184
APPARATUS FOR GAUGING TUBULAR OBJECTS
Filed Dec. 31, 1941  2 Sheets-Sheet 1
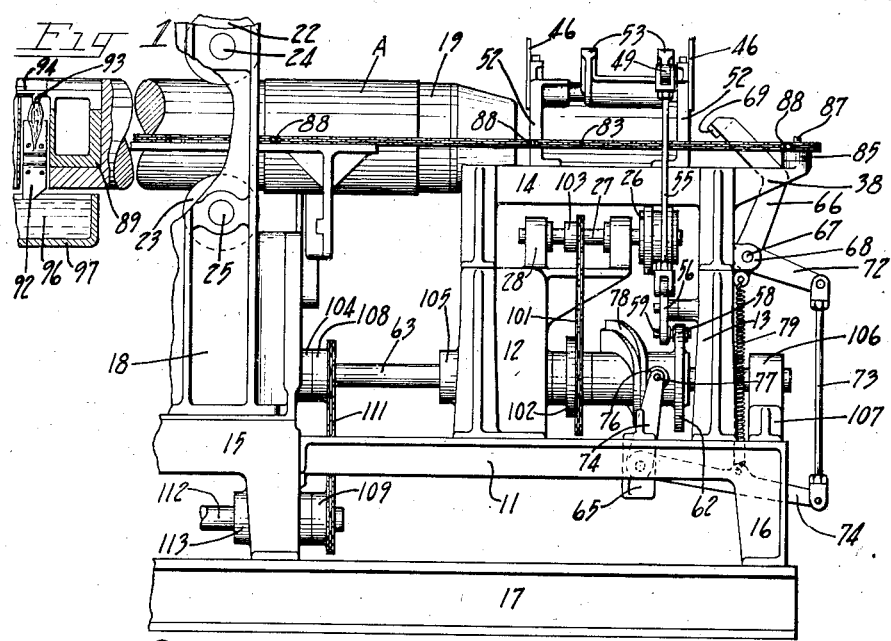
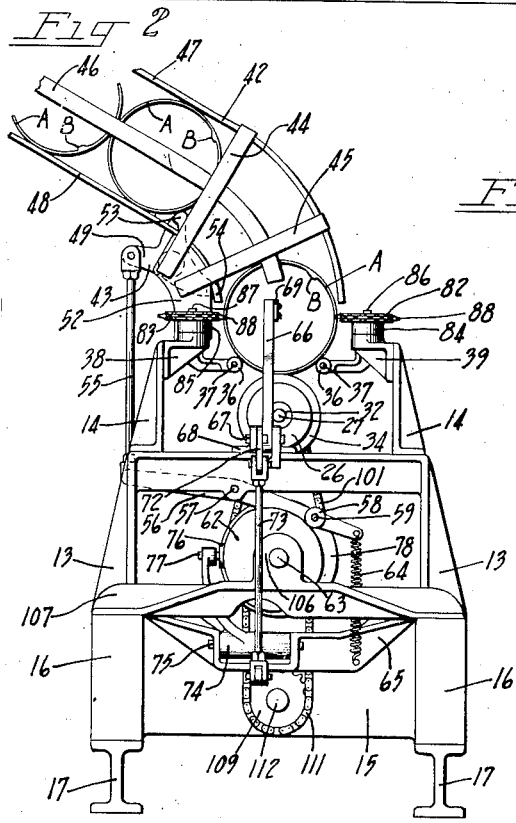
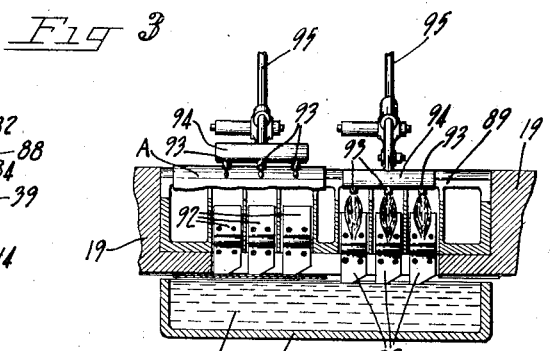
INVENTOR.
Ronald E. J. Nordquist
BY Ivan D. Thornburgh
Charles H. Erne
ATTORNEYS

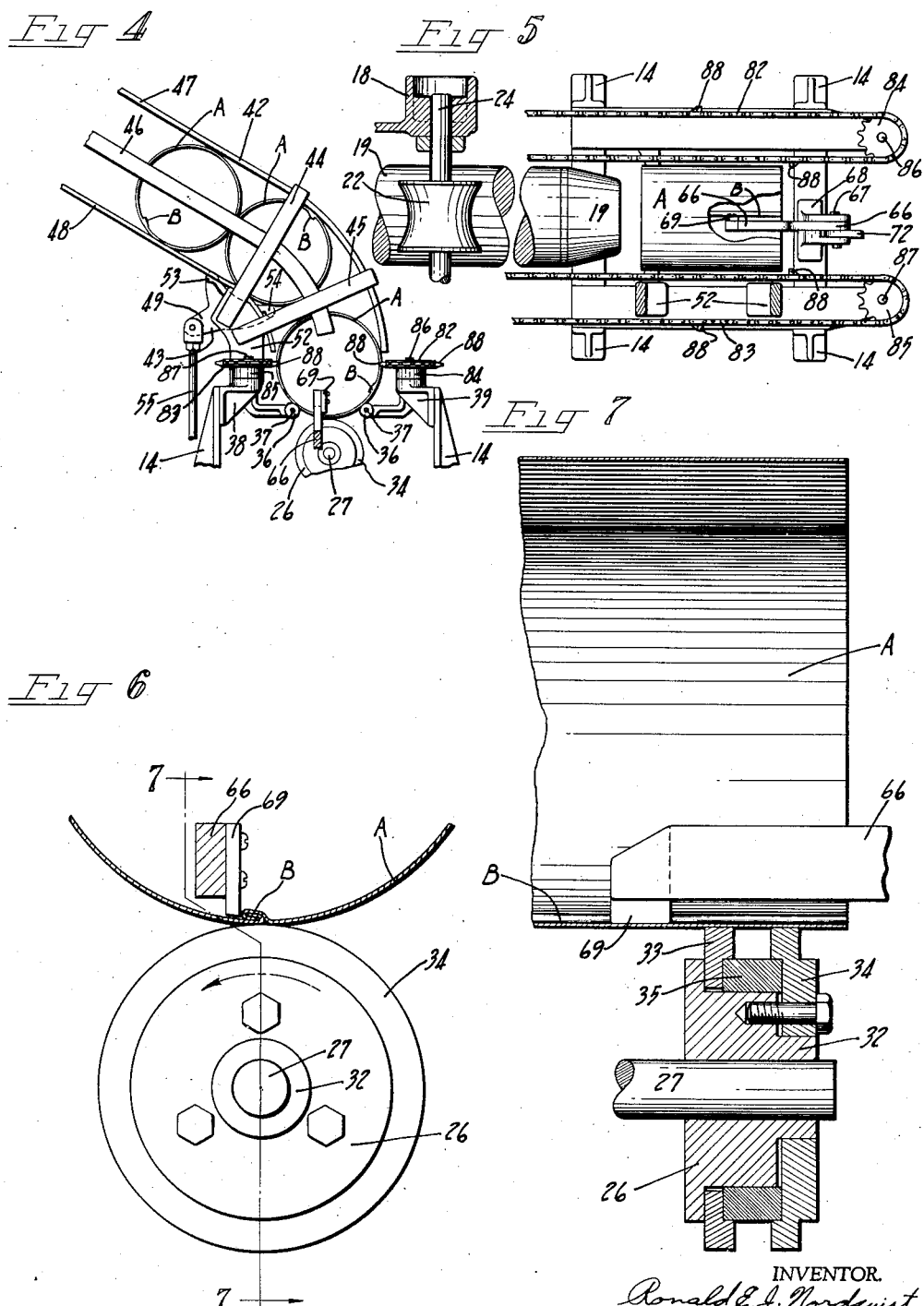

Patented July 11, 1944

2,353,184

UNITED STATES PATENT OFFICE 2,353,184

APPARATUS FOR GAUGING TUBULAR OBJECTS

Ronald E. J. Nordquist, Maplewood, N. J., assignor to American Can Company, New York, N. Y., a corporation of New Jersey Application December 31, 1941, Serial No. 425,185

5 Claims. (Cl. 198—33)

This invention relates to an apparatus for locating a definite area on the wall of tubular bodies and has particular reference to an apparatus for gauging the longitudinal seam joint of a tubular can body while introducing it, with the joint in a predetermined position, into a subsequent work station so that further operations may be performed.

The instant invention relates to an apparatus for rotating, gauging and registering the longitudinal seam joints of cylindrical cans or container bodies which have been formed previously and have been received from a bodymaker, the can bodies having their edges joined in a longitudinal seam, which however may be incomplete and the body may require further treatment. In passing such incompletely seamed can bodies to a side seam soldering machine, for example, when such machine is not a part of the body maker, it is necessary that the body be presented to the soldering operation with the longitudinal joint in a definite predetermined position.

The apparatus hereinafter described is applicable for use in connection with cans which are to be soldered along the interior or the exterior of the can side seam. The apparatus may be employed also in the registration of cans for any other further treatment and on other types of can making equipment where registration of a part of the can body is required.

An object of the invention is the provision of an apparatus for rotating tubular bodies to locate the body wall in a definite position to feed the body longitudinally into a work station while retaining the body in registration so that subsequent work operations may be performed on the located body wall.

Another object is the provision of an apparatus for rotating tubular can bodies to align the longitudinal side seam joint in a predetermined position to feed the body into a side seam soldering machine with the positioned side seam joint properly presented to the soldering instrumentalities.

A further object of the invention is the provision of an apparatus of the character described wherein cylindrical can bodies, received from a runway, are brought into place by rotating the body to locate a definite area adjacent the longitudinal joint on the inside of the can wall where it will be in correct position for feeding into a side seam soldering machine so that solder may be applied along such a positioned joint.

Numerous other objects and advantages of the invention will be apparent as it is better understood from the following description, which, taken in connection with the accompanying drawings, discloses a preferred embodiment thereof.

Referring to the drawings:

Figure 1 is a front elevation of an apparatus embodying the present invention which is shown as being connected to the entrance end of a soldering machine;

Fig. 2 is an end elevation of the apparatus shown in Fig. 1 illustrating an unregistered can body being delivered thereto from a runway;

Fig. 3 is a fragmentary sectional view through a soldering station, showing in detail, parts arranged for inside soldering of can bodies;

Fig. 4 is a view similar to Fig. 2 showing a gauging instrumentality operating adjacent the interior wall of a can body, as the latter is being rotated into registry;

Fig. 5 is a top plan view of the apparatus of Fig. 1 showing parts broken away and parts in section;

Fig. 6 is an enlarged view showing the registering and gauging instrumentalities in engagement with the lock seam joint of a fragmentary section of a can body; and Fig. 7 is a sectional view of the parts shown in Fig. 6 as viewed substantially along the broken line 7—7 in the latter figure.

The apparatus of the instant invention comprises an organized receiving, rotating and gauging mechanism for aligning tubular container bodies which have been formed previously into cylindrical shape preparatory to soldering. Such containers have a longitudinal side seam joint made by interlocking opposite hooked edges of a container body, the interhooked edges being interlocked in the conventional manner. The tubular bodies for the containers are then presented to a separate soldering machine wherein the longitudinal joint is soldered.

This invention is concerned with operations at the entrance end of the side seam soldering machine. The apparatus of the invention is designed to receive cylindrical can bodies from a supply stack. Figs. 2 and 4 of the accompanying drawings show how a supply of tubular bodies are delivered as they are received in an unregistered manner preparatory to alignment.

The apparatus is adapted to receive individual bodies from the runway by means of release devices disposed and operated in the runway for depositing single bodies into position for registration. Figs. 2 and 4 show an unregistered tubular body being placed upon a rotary member which is continuously revolved in any desirable manner. The rotating body is also guided on each side of the member by suitable rollers to maintain it in parallel and axial alignment with the soldering horn of the soldering machine.

The rotary member preferably is magnetized so that the metallic body will rotate with the member until a definite area of the body wall is brought into alignment with respect to a locating gauge. Thus in these tubular bodies, the longitudinal side seam may be brought into the desired position by means of a gauge which is operated intermittently at or adjacent the interior surface of the body. This locates the seam relative to a predetermined position in the apparatus.

Figs. 1 and 2 illustrate such a gauge in a non-operating position prior to being inserted in the open end of a body. Figs. 4, 6 and 7 show the gauge block when positioned for gauging the longitudinal seam. The latter two figures show the gauge directed against a lock side seam. With the gauge in this position the can body is registered and is stopped from further rotation relative to the continuously moving cylinder.

The tubular body after being registered as to position, is moved longitudinally onto a solder horn of a soldering machine. For this purpose a transfer conveyor is disposed on opposite sides of the tubular can body for moving the can onto the solder horn while maintaining the can in its registered position. Fig. 7 of the drawings shows the gauge extended beyond, as to the left of the rotating roller, thereby maintaining the can body in its registered position until it is moved away from the influence of the magnetic member.

The can body upon being moved onto the solder horn, is advanced along the horn by the usual feed conveyors which pass it through a side seam soldering station. It is at this station that the longitudinal side seam joint of the can body is soldered. Fig. 3 shows the details of a soldering device disposed at the soldering station and which is arranged for inside soldering of can bodies. This device includes a plurality of heated soldering irons located in a recessed section of the soldering horn.

The heated soldering irons are mounted and designed for movement downwardly into a solder bath to pick up sufficient molten solder for each can body as such a body is moved immediately thereafter into engagement with the irons. As the can body passes from right to the left (as illustrated in Fig. 3) the solder irons are lifted as the body strikes against the angular edge of the iron and thus solder is applied at a predetermined position on the inner wall of the can body. After the longitudinal side seam joint is soldered, the body is discharged from the soldering machine for subsequent can operations.

As illustrated in the drawings, the apparatus of the present invention is mounted on a bracket base 11 which supports intermediate frames 12, 13 and an upper frame 14 (Figs. 1 and 2). The bracket base 11 is secured at one end to a soldering machine main base 15 while the other end is supported by legs 16 of the bracket base. Both the support bracket and the soldering machine bases 11, 15 are mounted on a pair of spaced rails or I-beam sections 17.

An arch frame 18 mounted on the base 15 supports a soldering horn 19 in the conventional manner. Such a horn may be carried by rollers 22, 23 (Figs. 1 and 5) mounted on shafts 24, 25 in the arch frame 18.

A rotary member or cylinder 26 (Figs. 1, 6 and 7) is secured to one end of a shaft 27 which is rotatably mounted in brackets 28, 29 which extend up from the intermediate frame 12. Member 26 and its shaft 27 are in parallel alignment with the soldering horn 19 so that when tubular bodies are placed upon the cylinder for registration, they will be in direct axial alignment with the horn.

The rotary member 26 comprises a soft iron hub part 32 (Fig. 7) which is adapted to carry ring members 33, 34. These ring members are preferably formed from permanently magnetized material and are held in spaced relation on the hub part 32 by a non-magnetic annular spacer 35, the parts being secured to the hub. This construction forms a magnet unit between the hub part and the ring members which is circular in configuration and which imparts rotation to a tubular can body when the body comes into engagement with the rotating rings.

In order to deposit a tubular can body directly upon and in the desired parallel alignment with the magnetized member 26, side guide rollers 36 are provided. There are preferably two of such rollers disposed on each side of the rotary member 26 (Figs. 2 and 4). The rollers are rotatably mounted on pins 37 in side brackets 38, 39. Fig. 2 shows a tubular can body A being placed upon the member 26 while other unregistered bodies are held in a runway 42 by release or escapement devices 43.

The runway 42 comprises side bars 44, 45 which support a side guide rail 46 (Figs. 2 and 4). The side bars also support upper and lower guide rails 47, 48. Such a runway may be interposed between a bodymaker and the apparatus of the instant invention.

The escapement devices 43 include a plate member 49 which is cam actuated in timed relation with other parts of the apparatus. The plate member 49 is pivoted on a bracket 52 and has a set of spaced prongs as at 53, 54. When the member 49 is in the position of Fig. 2 the prongs 53 engage a tubular body A in the runway and this holds back the bodies thereabove. In such position, the lowermost body in the runway and below the held body will fall upon the rotary member 26. In the next position of the release devices 43, and the change of position takes place during the cycle of alignment of the released can body A, the prongs 54 are in position to support the can body which previously was held by the prongs 53, as just described. This provides a sufficient time interval for the released can body to be deposited onto the member 26 while the remaining can bodies above are held in the runway.

Escapement devices 43 are operated through a rod 55 (Figs. 1 and 2) which is connected at one end to the plate member 49 and to a lever 56 at the other. The lever 56 is pivoted on a pin 57 held in the intermediate frame 13. A cam roller 58 rotates a pin 59 carried on the lever 56 and is adapted for engagement with an edge cam 62 which is keyed to and rotated with a drive shaft 63. A spring 64 is connected to the end of the lever 56, opposite the rod connections and to a bracket 65 carried by the frame 11. This spring retains the roller 58 in engagement with the edge of the cam 62 at all times.

An angularly shaped lever 66 is pivoted on a pin 67 (Fig. 1) in a bracket 68 which is secured to the frame 13. The lever is adapted to swing into an opened end of a tubular body A when it is positioned for registration upon the rotating member 26. The lever 66 is part of the gauging mechanism and carries a gauge block 69 at one end. This block moves into the rotating can body and is engaged by the longitudinal side seam B of the body when it moves around into proper position. This action orients or places the body in proper alignment and ready for longitudinal movement onto the horn 19.

The gauge block 69 when it is disposed against the joint is spaced from the right hand edge of the can body A as viewed in Fig. 7. This view shows the gauge block to the left of the magnetized, rotating member 26. As the body A is moved longitudinally to the left, the gauge block continues to hold the body in its aligned position until the body is slid onto the soldering horn 19. At such time the body moves beyond the magnetic attraction of the rotating member.

The lever 66 (Figs. 1 and 2) has an integral arm 72 extended from its pivoted mounting on the pin 67. This arm is connected to one end of an operating rod 73 while the other end of the rod is connected to a cam actuated bell crank lever 74. This lever rocks on a pin 75 which is mounted in the bracket 65. A cam roller 76 is carried on a pin which projects from the end of a short arm of the lever. The roller 76 is adapted for engagement and operation with a barrel cam 78 which is secured to the shaft 63. A spring 79 has one end connected to the bracket 67 and the other end is secured to the lever 74. This maintains the cam roller 76 in engagement with the cam 78.

Can bodies are slid onto the soldering horn 19 and are moved longitudinally thereof by transferring conveyors 82, 83. These conveyors operate on opposite sides of horn 19 (Fig. 5) and are driven in any desirable manner in timed relation with the soldering machine. Conveyor chain sprockets 84, 85 rotate on pins 86, 87 which are mounted in the brackets 38, 39 and these sprockets support the conveyors at the apparatus end.

A plurality of conveyor feed fingers 88 are connected to the conveyor chains at spaced intervals. When the conveyors are driven uniformly in proper sequence, with the aligning apparatus, two of such fingers engage a registered body simultaneously at opposite sides and move the body from the rotary member onto the horn 19. Advancing along the horn, the body passes through the soldering machine during which time the side seam may be fluxed and soldered in the conventional manner.

This soldering step is shown by way of example as being performed from the interior of the can body as in the William M. Holloway Patent 1,947,-471. For this purpose the horn 19 has a recessed section at the soldering station where a side seam soldering mechanism 89 is located. Fig. 3 shows a plurality of soldering irons 92 heated by individual burners 93 carried in a manifold 94. The irons preferably are heated by gas which may be supplied to the manifolds by pipes 95. The heat is applied to each iron while it is in a lowered or non-soldering position and the irons are lifted out of the path of a can body A passing the irons. The manifold 94 with the burners 93 is swung upwardly out of the path of the body to remove the heat from the irons.

When the irons are in lowered position they dip down into molten solder 96 carried in a solder pot 97. The solder pot is heated and a constant level of solder is maintained in the pot as shown in the Holloway patent.

The shaft 27 hereinbefore referred to for rotating the cylindrical magnetic member 26 is driven by a roller chain drive 101 (Figs. 1 and 2). This chain drive is carried over a drive sprocket 102 mounted on the drive shaft 63 and over the sprocket 103 on the shaft 27. The shaft 63 is journaled in bearings 104, 105 in the arch frame 18 and in the intermediate frame 12 and in a bearing 106 provided in an end support bracket 107. A chain sprocket 108 mounted on the shaft 63 is driven from a chain drive sprocket 109 by a roller drive chain 111. The sprocket 109 is secured to an end of a shaft 112 carried in a bearing 113 in the base 15. The shaft 112 is connected to and may be driven by the main drive of the soldering machine in any desired manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for aligning lock side seams of cylindrical metallic can bodies preparatory to soldering, comprising a rotary member for receiving and supporting said bodies, means for delivering individual can bodies to said member, means for rotating said rotary member, said member having spaced magnetized annular rings cooperating to provide a magnet unit adapted for rotation of said can body by engagement with the peripheral surface of the latter, a gauge engageable with the inner surface of the rotating can body for locating its side seam by stopping the body when the seam is in a predetermined position, and means for moving the positioned can body longitudinally out of engagement with said rotary member.

2. An apparatus for aligning unregistered sheet metal tubular bodies having longitudinal side seams for subsequent work operations, comprising a magnetized rotary member for rotating a tubular body, a gauge operable on said tubular body while the body is rotating for engaging and locating the side seam of the body wall in a definite axial position, means for moving said gauge into engagement with a rotating body wall, and feeding devices for moving the body longitudinally while retaining such axial position.

3. An apparatus for aligning unregistered sheet metal tubular bodies having longitudinal side seams for subsequent work operations, comprising feeding devices for delivering an individual body to a work station, a magnetized rotary member mounted adjacent said work station and adapted to rotate said body on its axis by engaging the peripheral surface of the body, a gauge operable on the rotating body for stopping its rotation by engaging the side seam thereof in a definite axial position, means for moving said gauge into engagement with the wall of a rotating body, and means for moving the said aligned body longitudinally out of engagement with said rotary member while said gauge maintains the oriented axial position of the body.

4. An apparatus for aligning unregistered sheet metal tubular metallic can bodies having longitudinal side seams in a predetermined position for soldering, comprising a rotatable roller including magnetic means for rotating a tubular can body when the peripheral surface of said body is in contact with said roller, a gauge operable against the inner surface of said rotating body for engaging and locating the side seam of the body wall in a definite axial position and for retaining the body in such position, means for moving said gauge into engagement with the inner surface of a rotating can body, and means for moving the registered body longitudinally out of engagement with said roller.

5. An apparatus for aligning the longitudinal side seams of cylindrical metallic can bodies preparatory to soldering, comprising a rotary member having magnetic means secured thereto for receiving and supporting said bodies, means for delivering individual can bodies to said member, means for rotating said member to rotate the supported body on its axis with the peripheral surfaces of the member and the body in engagement, a gauge engageable with said revolving can body for engaging and locating the side seam in predetermined axial position by stopping rotation of said body when the said seam is in such axial position, and means for moving the said positioned can body longitudinally out of engagement with said rotary member.

RONALD E. J. NORDQUIST.